United States Patent
Tang et al.

(10) Patent No.: US 10,958,497 B2
(45) Date of Patent: Mar. 23, 2021

(54) METHOD AND APPARATUS FOR PROCESSING MODULATION SYMBOL

(71) Applicant: ZTE CORPORATION, Shenzhen (CN)

(72) Inventors: Hong Tang, Shenzhen (CN); Jianqiang Dai, Shenzhen (CN); Zhifeng Yuan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/324,416

(22) PCT Filed: Oct. 31, 2016

(86) PCT No.: PCT/CN2016/104064
§ 371 (c)(1),
(2) Date: Feb. 8, 2019

(87) PCT Pub. No.: WO2018/028054
PCT Pub. Date: Feb. 15, 2018

(65) Prior Publication Data
US 2019/0268211 A1 Aug. 29, 2019

(30) Foreign Application Priority Data
Aug. 9, 2016 (CN) .......................... 201610654251.0

(51) Int. Cl.
*H04L 27/00* (2006.01)
*H04L 27/34* (2006.01)
*H04L 27/32* (2006.01)

(52) U.S. Cl.
CPC .......... *H04L 27/3483* (2013.01); *H04L 27/00* (2013.01); *H04L 27/32* (2013.01)

(58) Field of Classification Search
CPC ...... H04L 27/3483; H04L 27/00; H04L 27/32
(Continued)

(56) References Cited

U.S. PATENT DOCUMENTS

2011/0274024 A1* 11/2011 Liu ....................... H04L 1/1861
370/311
2014/0314006 A1 10/2014 Suh et al.

FOREIGN PATENT DOCUMENTS

| CN | 104158631 A | 11/2014 |
|----|-------------|---------|
| CN | 104754719 A | 7/2015  |
| CN | 105743824 A | 7/2016  |

OTHER PUBLICATIONS

English Translation of International Search Report for International Application No. PCT/CN2016/104064 dated May 2, 2017, 2 pages.

* cited by examiner

*Primary Examiner* — Helene E Tayong
(74) *Attorney, Agent, or Firm* — Li & Cai Intellectual Property (USA) Office

(57) ABSTRACT

The present invention relates to a method and apparatus for processing a modulation symbol. The processing method includes: a transmitter obtaining a transmission power ratio $\alpha j$, wherein in the transmission power ratio $\alpha_j \in \{\alpha_0, \alpha_1, \alpha_2\}$, j is a natural number, and $\alpha_0$, $\alpha_1$ and $\alpha_2$ are all positive numbers; and the transmitter modulating a first group of bit sequences $b0(i)$, $b_0(i+1)$ and a second group of bit sequences $b_1(i)$, $b_1(i+1)$, . . . , $b_1(i+n)$ according to the transmission power ratio $\alpha_j$ so as to obtain a modulation symbol, wherein i is a natural number, and $n \in \{1, 3, 5\}$. The present invention solves the problem in the relevant art that an uncertain number of transmission power ratios affects the performance of a system and increases the design complexity of signaling, thereby reducing signaling overheads and improving system stability and demodulation performance.

20 Claims, 4 Drawing Sheets

Transmitter obtains a transmission power ratio $\alpha_j$, where the transmission power ratio $\alpha_j \in \{\alpha_0, \alpha_1, \alpha_2\}$, j is a natural number, $\alpha_0, \alpha_1$ and $\alpha_2$ are positive numbers — S202

The transmitter modulates a first set of bit sequence $b_0(i), b_0(i+1)$ and a second set of bit sequence $b_1(i), b_1(i+1), \ldots, b_1(i+n)$ according to the transmission power ratio $\alpha_j$, to obtain a modulation symbol, where $i$ is a natural number, $n \in \{1, 3, 5\}$ — S204

(58) Field of Classification Search
USPC .......................................................... 375/295
See application file for complete search history.

METHOD AND APPARATUS FOR PROCESSING MODULATION SYMBOL

CROSS REFERENCE

The present application is a continuing application of International Application No. PCT/CN2016/104064, filed on Oct. 31, 2016, which is based upon and claims priority to Chinese Patent Application No. 201610654251.0, filed on Aug. 9, 2016, and the entire contents thereof are incorporated herein by reference.

TECHNICAL FIELD

The present disclosure relates to the field of communication, and in particular to a method and an apparatus for processing a modulation symbol.

BACKGROUND

The superimposed transmission in the communication field means that a downlink non-orthogonal multiple access (NOMA) system simultaneously transmits data to multiple receiving terminals on the same time-frequency resource, and the receiving terminals are divided into near users and far users. Bit information sent by a transmitter to the near users is modulated and mapped to obtain a set of data symbols. Bit information sent by the transmitter to the far users is modulated and mapped to obtain another set of data symbols. The two sets of data symbols are weighted according to transmission power ratios to obtain combined data symbols, and then sent to the far users and the near users.

A transmission power ratio is a ratio of the transmission power allocated by the transmitter to a far user on a superposition layer to the total transmission power on the superposition layer.

Compared with an orthogonal multiple access system, the data symbols mapped by the NOMA system to the time-frequency resource are none of modulation symbols of a single user, including Binary Phase Shift Keying (BPSK) modulation symbols, Quadrature Phase Shift Keying (QPSK) modulation symbols, Quadrature Amplitude Modulation of 16 symbols (16 QAM) modulation symbols, 64 QAM modulation symbols and 256 QAM modulation symbols, but an uncertain combined constellation symbol generated by superposition coding. Demodulating such uncertain combined constellation symbol may result in increased signaling overhead and degraded demodulation performance.

The main reason for the uncertainty of the combined constellation symbol is that the transmission power ratios are uncertain. The uncertainty of the transmission power ratios means that it is difficult to determine the specific values of the transmission power ratios and the number of the transmission power ratios, which may seriously affect the performance of the system and increase complexity of the signaling design.

In the related art, there has no effective solution proposed to the problem that the performance of the system is affected and the complexity of signaling design is increased since the number of the transmission power ratios is uncertain.

SUMMARY

Embodiments of the present disclosure provide a method and an apparatus for processing a modulation symbol.

According to an embodiment of the present disclosure, there is provided a method for processing a modulation symbol, including: obtaining, by a transmitter, a transmission power ratio $\alpha_j$, wherein the transmission power ratio $\alpha_j \in \{\alpha_0, \alpha_1, \alpha_2\}$, j is a natural number, $\alpha_0$, $\alpha_1$ and $\alpha_2$ are all positive numbers; and modulating, by the transmitter, a first set of bit sequence $b_0(i)$, $b_0(i+1)$ and a second set of bit sequence $b_1(i)$, $b_1(i+1)$, . . . , $b_1(i+n)$ according to the transmission power ratio $\alpha_j$, to obtain a modulation symbol, where i is a natural number, and $n \in \{1, 3, 5\}$.

Optionally, the $\alpha_0$ is an element in a set A, the $\alpha_1$ and $\alpha_2$ are elements in a set B, and the set B is a discrete subset of a set [0.7, 0.95].

Optionally, the set A includes 3 elements, and the value of n is inversely related to the transmission power ratio $\alpha_0$.

Optionally, a combined constellation is determined by the transmission power ratio $\alpha_j$, and a difference between a non-normalized I-path value of the combined constellation and an integer $Z_I$ is smaller than a first threshold, and $Z_I$ is taken from a set $\{\pm 1, \pm 2, \pm 3, \pm 4, \pm 5, \pm 6, \pm 7, \pm 8, \pm 9, \pm 10, \pm 11, \pm 13, \pm 15, \pm 17, \pm 19\}$; and a difference between a non-normalized Q-path value of the combined constellation and an integer $Z_Q$ is less than a second threshold, and the $Z_Q$ is taken from the set $\{\pm 1, \pm 2, \pm 3, \pm 4, \pm 5, \pm 6, \pm 7, \pm 8, \pm 9, \pm 10, \pm 11, \pm 13, \pm 15, \pm 17, \pm 19\}$.

Optionally, the combined constellation is obtained by mapping the modulation symbol, and a bit sequence mapped at a constellation point in the k-th row and the l-th column in a q-point combined constellation is the same as a bit sequence mapped at a constellation point in the k-th row and the l-th column in the q-point combined constellation in an LTE application, and q is taken from a set $\{16, 64, 256\}$.

Optionally, the elements of the set B are uniformly distributed between [0.8, 0.95] and an interval of the distribution is 0.05 or 0.025.

Optionally, modulating, by the transmitter, a first set of bit sequence $b_0(i)$, $b_0(i+1)$ and a second set of bit sequence $b_1(i)$, $b_1(i+1)$, . . . , $b_1(i+n)$ according to the transmission power ratio $\alpha_j$, to obtain a modulation symbol, includes: according to the transmission power ratio $\alpha_j$, modulating the first set of bit sequence $b_0(i)$, $b_0(i+1)$ to generate a first weighted modulation symbol $\sqrt{\alpha_j}x_0$, where $x_0$ denotes a first modulation symbol; and according to the transmission power ratio $\alpha_j$, modulating the first set of bit sequence $b_0(i)$, $b_0(i+1)$ and the second set of bit sequence $b_1(i)$, $b_1(i+1)$, . . . , $b_1(i+n)$ to generate a second weighted modulation symbol $\sqrt{1-\alpha_j}x_1$, where $x_1$ denotes a second modulation symbol.

Optionally, modulating, by the transmitter, a first set of bit sequence $b_0(i)$, $b_0(i+1)$ and a second set of bit sequence $b_1(i)$, $b_1(i+1)$, . . . , $b_1(i+n)$ according to the transmission power ratio $\alpha_j$, to obtain a modulation symbol, includes: performing joint modulation and mapping on the first set of bit sequence $b_0(i)$, $b_0(i+1)$ and the second set of bit sequence $b_1(i)$, $b_1(i+1)$, . . . , $b_1(i+n)$ to obtain a first modulation symbol $x_0$ and a second modulation symbol $x_1$; and weighting the obtained first modulation symbol $x_0$ and the second modulation symbol $x_1$ according to the transmission power ratio $\alpha_j$, to obtain the modulation symbol.

Optionally, the first set of bit sequence $b_0(i)$, $b_0(i+1)$ is modulated with a first modulation mode, to obtain the first modulation symbol $x_0$; and the combination of the first set of bit sequence $b_0(i)$, $b_0(i+1)$ and the second set of bit sequence $b_1(i)$, $b_1(i+1)$, . . . , $b_1(i+n)$ are modulated with a second modulation mode, to obtain the second modulation symbol $x_1$.

Optionally, the first modulation symbol $x_0$ and the second modulation symbol $x_1$ are respectively determined by the following formula:

$$x_0 = \text{modulator\_LTE}(b_0(i), b_0(i+1)),$$

$$x_1 = \text{modulator\_LTE}(f((b_0(i), b_0(i+1)), (b_1(i)b_1(i+1) \ldots b_1(i+n)))),$$

where modulator_LTE denotes a long-term evolution (LTE) modulation mode using the LTE technology.

Optionally, when n=1, the first set of bit sequence is $b_0(i)$, $b_0(i+1)$ the second set of bit sequence is $b_1(i)$, $b_1(i+1)$ the first set of bit sequence $b_0(i)$, $b_0(i+1)$ is modulated with a first modulation mode to obtain a first modulation symbol $x_0$, and the combination of the first set of bit sequence $b_0(i)$, $b_0(i+1)$ and the second set of bit sequence $b_1(i)$, $b_1(i+1)$, . . . , $b_1(i+n)$ is modulated with a second modulation mode to obtain a second modulation symbol $x_1$; and the first modulation mode includes: Quadrature Phase Shift Keying QPSK modulation, the second modulation mode includes: QPSK modulation, and the transmission power ratio $\alpha_j$ belongs to a set M, where the set M={m1, m2, m3}.

Optionally, the m1=0.8, the m2 and m3 are elements of a set B1, and the set B1 is a discrete subset of the set [0.8, 0.95].

Optionally, the elements of the set B1 are uniformly distributed between [0.8, 0.95].

Optionally, when n=3, the first set of bit sequence is $b_0(i)$, $b_0(i+1)$, the second set of bit sequence is $b_1(i)$, $b_1(i+1)$, $b_1(i+2)$, $b_1(i+3)$, the first set of bit sequence $b_0(i)$, $b_0(i+1)$ is modulated with a first modulation mode to obtain a first modulation symbol $x_0$, and the combination of the first set of bit sequence $b_0(i)$, $b_0(i+1)$ and the second set of bit sequence $b_1(i)$, $b_1(i+1)$, . . . , $b_1(i+n)$ is modulated with a second modulation mode to obtain a second modulation symbol $x_1$; and the modulation mode of the first modulation includes QPSK modulation, and the modulation mode of the second modulation includes Quadrature Amplitude Modulation of 16 symbols 16QAM, the transmission power ratio $\alpha_j$ belongs to a set R, where the set R={r1, r2, r3}.

Optionally, the r1=0.762, the r2, r3 are elements of a set B2, and the set B2 is a discrete subset of a set [0.75, 0.95].

Optionally, the elements of the set B2 are uniformly distributed between [0.8, 0.95].

Optionally, when n=5, the first set of bit sequence is $b_0(i)$, $b_0(i+1)$, the second set of bit sequence is $b_1(i)$, $b_1(i+1)$, $b_1(i+2)$, $b_1(i+3)$, $b_1(i+4)$, $b_1(i+5)$, the first set of bit sequence $b_0(i)$, $b_0(i+1)$ is modulated with a first modulation mode to obtain a first modulation symbol $x_0$, and the combination of the first set of bit sequence $b_0(i)$, $b_0(i+1)$ and the second set of bit sequence $b_1(i)$, $b_1(i+1)$, . . . , $b_1(i+n)$ is modulated with a second modulation mode to obtain a second modulation symbol $x_1$; and the modulation mode of the first modulation includes QPSK modulation, and the modulation mode of the second modulation includes 64QAM modulation, the transmission power ratio $\alpha_j$ belongs to a set P, where the set P={p1, p2, p3}.

Optionally, the p1=0.753, the p2, p3 being an element of a set B3, and the set B3 is a discrete subset of a set [0.75, 0.95].

Optionally, the elements of the set B3 are uniformly distributed between [0.75, 0.95].

Optionally, when the values of n are different, the sets of values of the transmission power ratios are different, when n=1, $\alpha_j$ belongs to a set M, when n=3, $\alpha_j$ belongs to a set R, and when n=5, $\alpha_j$ belongs to a set P, there is an intersection between the sets M, R, and P, and the intersection is not empty.

Optionally, the intersection is a subset of a set {0.8, 0.85, 0.875, 0.9}.

Optionally, the transmission power ratio $\alpha_j$ is transmitted with 2-bit signaling, and the 2 bits include four states, of which three states denote the values of $\alpha_j$, and one state denotes the switching of the transmission mode.

According to another embodiment of the present disclosure, there is also provided a method for processing a modulation symbol, including: demodulating a received modulation symbol to obtain a first set of bit sequence $b_0(i)$, $b_0(i+1)$ and a second set of bit sequence $b_1(i)$, $b_1(i+1)$, . . . , $b_1(i+n)$, and the modulation symbol is modulated by the first set of bit sequence and the second set of bit sequence according to a transmission power ratio $\alpha_j$, where i is a natural number, n∈{1, 3, 5}, the transmission power ratio $\alpha_j$ {$\alpha_0$, $\alpha_1$, $\alpha_2$}, j is a natural number, $\alpha_0$, $\alpha_1$ and $\alpha_2$ are all positive numbers.

According to another embodiment of the present disclosure, there is also provided an apparatus for processing a modulating symbol, applied in a transmitter, including: an obtaining a module, configured to obtain a transmission power ratio $\alpha_j$, and the transmission power ratio $\alpha_j \in \{\alpha_0, \alpha_1, \alpha_2\}$, j is a natural number, $\alpha_0$, $\alpha_1$ and $\alpha_2$ are all positive numbers; and a modulation module, configured to modulate a first set of bit sequence $b_0(i)$, $b_0(i+1)$ and a second set of bit sequence $b_1(i)$, $b_1(i+1)$, . . . , $b_1(i+n)$ according to the transmission power ratio $\alpha_j$ to obtain a modulation symbol, where i is a natural number, n∈{1, 3, 5}.

Optionally, the $\alpha_0$ is an element in a set A, the $\alpha_1$ and $\alpha_2$ are elements in a set B, and the set B is a discrete subset of a set [0.7, 0.95].

Optionally, the set A includes 3 elements and the value of n is inversely related to the transmission power ratio $\alpha_0$.

Optionally, the elements of the set B are uniformly distributed between [0.8, 0.95] and an interval of the distribution is 0.05 or 0.025.

Optionally, the modulation module includes: a first modulation unit configured to, according to the transmission power ratio $\alpha_j$, modulate the first set of bit sequence $b_0(i)$, $b_0(i+1)$ to generate a first weighted modulation symbol $\sqrt{\alpha_j} x_0$, where $x_0$ denotes a first modulation symbol; a second modulation unit configured to, according to the transmission power ratio $\alpha_j$, modulate the first set of bit sequence $b_0(i)$, $b_0(i+1)$ and the second set of bit sequence to generate a second weighted modulation symbol $\sqrt{1-\alpha_j} x_1$, where $x_1$ denotes a second modulation symbol.

Optionally, when the values of n are different, the set of values of the transmission power ratios is different, when n=1, $\alpha_j$ belongs to a set M, when n=3, $\alpha_j$ belongs to a set R, and when n=5, $\alpha_j$ belongs to a set P, there is an intersection between the sets M, R, and P, and the intersection is not empty.

Optionally, the intersection is a subset of a set {0.8, 0.85, 0.875, 0.9}.

Optionally, the transmission power ratio $\alpha_j$ is transmitted with 2-bit signaling, and the 2 bits include four states, of which three states denote the values of $\alpha_j$, and one state denotes the switching of the transmission mode.

According to another embodiment of the present disclosure, there is also provided an apparatus for processing a modulating symbol, applied to a receiver, including: a demodulation module configured to demodulate a received modulation symbol to obtain a first set of bit sequence $b_0(i)$, $b_0(i+1)$ and a second set of bit sequence $b_1(i)$, $b_1(i+1)$, . . . , $b_1(i+n)$, where the modulation symbol is modulated by the first set of bit sequence and the second set of bit sequence according to a transmission power ratio $\alpha_j$, where i is a natural number, $n \in \{1, 3, 5\}$, the transmission power ratio $\alpha_j \{\alpha_0, \alpha_1, \alpha_2\}$, j is a natural number, and $\alpha_0$, $\alpha_1$ and $\alpha_2$ are all positive numbers.

In an embodiment of the present invention, there is also provided a computer storage medium, which may store an execution instruction for performing the processing of the modulation symbol in the above embodiments.

According to the embodiments of the present disclosure, two sets of bit sequences are modulated according to a transmission power ratio to obtain a modulation symbol, and the number of transmission power ratios is determined to be three, which can solve the problem in the related art that the performance of the system is affected and the complexity of signaling design is increased since the number of the transmission power ratios is uncertain, and in turn, can reduce the signaling overhead and improve the system stability and demodulation performance.

BRIEF DESCRIPTION OF THE DRAWINGS

The drawings described herein are intended to provide a further understanding of the present disclosure, and are intended to constitute a part of the present application. The illustrative embodiments of the present disclosure and their description serve to explain the present disclosure, and do not constitute an improper limiting of the present disclosure. In the drawing.

DETAILED DESCRIPTION

The present disclosure will be described in detail below with reference to the accompanying drawings in conjunction with the embodiments. It should be noted that the embodiments in the present application and the features in the embodiments may be combined with each other without conflict.

It is to be understood that the terms "first", "second", and the like in the specification and claims as well as the above accompanying drawings of the present disclosure are used to distinguish similar objects, and are not necessarily used to describe a particular order or sequence. It is to be understood that the data so used may be interchanged where appropriate, so that the embodiments of the present disclosure described herein can be implemented in a sequence other than those illustrated or described herein. In addition, the terms "comprise" and "have" and any variation thereof are intended to cover a non-exclusive inclusion. For example, a process, method, system, product, or device that comprises a series of steps or units is not necessarily limited to those steps or units explicitly listed, and may include other steps or units not explicitly listed or inherent to such process, method, product or device.

First Embodiment

According to an embodiment of the present disclosure, there is provided an embodiment of a method for processing a modulation symbol, and it is noted that the steps illustrated in the flowchart of the accompanying drawings may be performed in a computer system such as a set of computer executable instructions. Although a logical order is shown in the flowcharts, in some cases the steps shown or described may be performed in a different order than the ones described herein.

Figure 1:
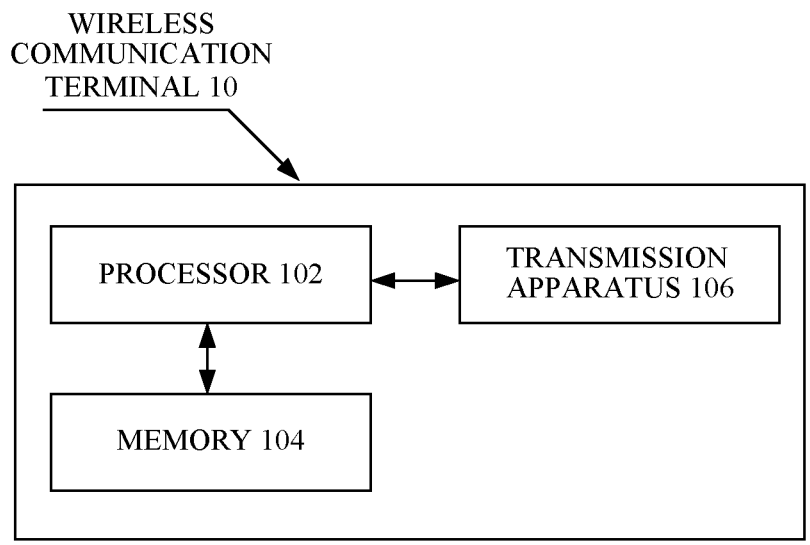
FIG. 1 is a block diagram showing a hardware structure of a wireless communication terminal of a method for processing a modulation symbol according to an embodiment of the present disclosure.

The method embodiment provided by the first embodiment of the present application can be performed in a mobile terminal, a wireless communication terminal, or other similar computing device. Taking a wireless communication terminal as an example, FIG. 1 is a block diagram showing the hardware structure of a wireless communication terminal of a method for processing a modulation symbol according to an embodiment of the present disclosure. As shown in FIG. 1, the wireless communication terminal 10 may include one or more (only one being shown) processor 102 (which may include, but is not limited to, a processing device such as a microprocessor MCU or a programmable logic device FPGA), a memory 104 for storing data, and a transmission apparatus 106 for communication function. It will be understood by those skilled in the art that the structure shown in FIG. 1 is merely illustrative and does not limit the structure of the above electronic device. For example, the wireless communication terminal 10 may also include more or fewer components than those shown in FIG. 1, or have a different configuration than that shown in FIG. 1.

The memory 104 can be used to store software programs and modules of the application software, such as program instructions/modules corresponding to the method for processing a modulation symbol in the embodiments of the present disclosure. The processor 102 executes the software programs and modules stored in the memory 104 to perform various functional applications and data processing, that is, to implement the above method for processing a modulation symbol. The memory 104 may include a high speed random access memory, and may also include non-volatile memory such as one or more magnetic storage devices, a flash memory, or other non-volatile solid state memory. In some examples, the memory 104 may further include a memory remotely located relative to the processor 102, and such remote memory may be connected to the wireless communication terminal 10 over a network. Examples of such networks include, but are not limited to, an Internet, an intranet, a local area network, a mobile communication network, and combination thereof.

The transmission apparatus 106 is for receiving or transmitting data over a network. The specific example of the above-described network may include a wireless network provided by a communication provider of the wireless communication terminal 10. In one example, the transmission apparatus 106 includes a Network Interface Controller (NIC) that can be connected to other network devices through a base station to communicate with the Internet. In one example, the transmission apparatus 106 can be a Radio Frequency (RF) module for communicating with the Internet wirelessly.

Figure 2:
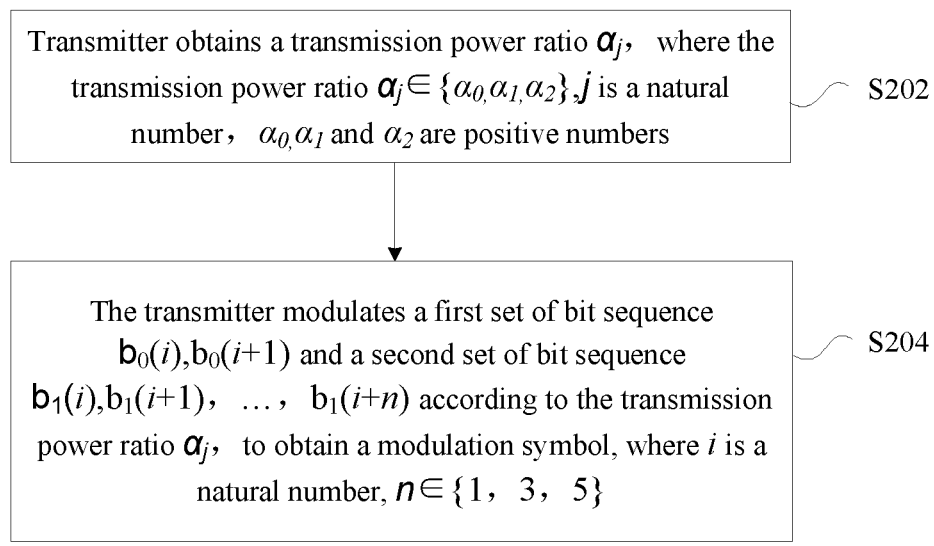
FIG. 2 is a flowchart of a method for processing a modulation symbol at a transmitter side according to a first embodiment of the present disclosure.

In the above operating environment, the present application provides an embodiment of a method for processing a modulation symbol as shown in FIG. 2. FIG. 2 is a flowchart of a method for processing a modulation symbol according to the first embodiment of the present disclosure. As shown in FIG. 2, the method includes the following steps.

In Step S202, the transmitter obtains a transmission power ratio $\alpha_j$ where the transmission power ratio $\alpha_j \in \{\alpha_0, \alpha_1, \alpha_2\}$, j is a natural number, $\alpha_0$, $\alpha_1$ and $\alpha_2$ are all positive numbers.

In Step S204, the transmitter modulates a first set of bit sequence $b_0(i)$, $b_0(i+1)$ and a second set of bit sequence $b_1(i)$, $b_1(i+1)$, ..., $b_1(i+n)$ according to the transmission power ratio $\alpha_j$ to obtain a modulation symbol, where i is a natural number, $n \in \{1, 3, 5\}$.

Through the above steps, the two sets of bit sequences are modulated according to the transmission power ratios to obtain a modulation symbol, and the number of transmission power ratios is determined to be 3, which can solve the problem in the related art that the performance of the system is affected and the complexity of signaling design is increased since the number of the transmission power ratios is uncertain, and in turn, can reduce the signaling overhead and improve the system stability and demodulation performance.

It should be noted that the entity for performing the method may be a transmitter device such as a transmitter, a modulator, or the like, or any other device having a modulation and encoding function, which is not limited in this embodiment.

In an implementation of the embodiment of the present disclosure, $\alpha_0$ is an element in the set A, $\alpha_1$ and $\alpha_2$ are elements in the set B, and the set B is a discrete subset of a set [0.7, 0.95].

For example, the set A includes three elements, and the value of n is inversely related to the transmission power ratio $\alpha_0$. That is, as the value of n becomes larger, the transmission power ratio $\alpha_0$ becomes smaller in the set A. The elements of the set B are uniformly distributed between [0.8, 0.95], and the interval of the distribution is 0.05 or 0.025. For example, the value of a set B1 may include 0.8, 0.825, 0.85, 0.875, 0.925, and so on.

In an exemplary implementation of the embodiment of the present disclosure, the transmitter, according to the transmission power ratio $\alpha_j$, modulates the first set of bit sequence $b_0(i)$, $b_0(i+1)$ and the second set of bit sequence $b_1(i)$, $b_1(i+1)$, ..., $b_1(i+n)$ to obtain a modulation symbol, which includes: according to the transmission power ratio $\alpha_j$, modulating the first set of bit sequence $b_0(i)$, $b_0(i+1)$ to generate a first weighted modulation symbol $\sqrt{\alpha_j}x_0$, where $x_0$ denotes a first modulation symbol; and according to the transmission power ratio $\alpha_j$, modulating the first set of bit sequence $b_0(i)$, $b_0(i+1)$ and the second set of bit sequence $b_1(i)$, $b_1(i+1)$, ..., $b_1(i+n)$ to generate a second weighted modulation symbol $\sqrt{1-\alpha_j}x_1$, where $x_1$ denotes a second modulation symbol.

The method may include the following steps: performing joint modulation and mapping on the first set of bit sequence $b_0(i)$, $b_0(i+1)$ and the second set of bit sequence $b_1(i)$, $b_1(i+1)$, ..., $b_1(i+n)$ to obtain a first modulation symbol $x_0$ and a second modulation symbol $x_1$; and weighting the obtained first modulation symbol $x_0$ and the second modulation symbol $x_1$ according to a transmission power ratio $\alpha_j$, to obtain the modulation symbol.

Performing joint modulation and mapping on the first set of bit sequence $b_0(i)$, $b_0(i+1)$ and the second set of bit sequence $b_1(i)$, $b_1(i+1)$, ..., $b_1(i+n)$ to obtain a first modulation symbol $x_0$ and a second modulation symbol $x_1$ includes: modulating the first set of bit sequence $b_0(i)$, $b_0(i+1)$ with a first modulation mode, to obtain the first modulation symbol $x_0$; and modulating the combination of the first set of bit sequence $b_0(i)$, $b_0(i+1)$ and the second set of bit sequence $b_1(i)$, $b_1(i+1)$, ..., $b_1(i+n)$ with a second modulation mode, to obtain the second modulation symbol $x_1$.

The embodiment of the present disclosure also provides calculation formulas for the first modulation symbol $x_0$ and the second modulation symbol $x_1$, as follows:

$$x_0 = \text{modulator\_LTE}(b_0(i), b_0(i+1)),$$

$$x_1 = \text{modulator\_LTE}(f((b_0(i), b_0(i+1)), (b_1(i)b_1(i+1) \ldots b_1(i+n)))),$$

where, modulator_LTE denotes a long-term evolution (LTE) modulation mode using the LTE technology.

The obtained two modulation symbols are weighted according to a transmission power ratio $\alpha_j$ to obtain a modulation symbol, which can be implemented by:

allocating transmission power to the modulation symbols $x_0$ and $x_1$ according to the power ratio $\alpha_j$, to obtain the modulation symbol through the following formula:

$$\sqrt{\alpha_j}x_0 + \sqrt{1-\alpha_j}x_1.$$

In an exemplary implementation of the present embodiment, when n=1, the first set of bit sequence is $b_0(i)$, $b_0(i+1)$, the second set of bit sequence is $b_1(i)$, $b_1(i+1)$, the first modulation mode may be QPSK modulation, and the second modulation mode may be QPSK modulation. In this case, the transmission power ratio $\alpha_j$ belongs to a set M, where the set M={m1, m2, m3}.

For example, m1=0.8, m2, m3 are elements of the set B1, and the set B1 is a discrete subset of a set [0.8, 0.95]. The elements of the set B1 are uniformly distributed between [0.8, 0.95], and the interval of the distribution is 0.025. For example, the values of the set B1 may include 0.8, 0.825, 0.85, 0.875, 0.925, and so on.

Optionally, a combined constellation is determined by the transmission power ratio $\alpha_j$, where a difference between a non-normalized I-path value of the combined constellation and an integer $Z_I$ is less than a first threshold, and $Z_I$ is taken from a set $\{\pm1, \pm2, \pm3, \pm4, \pm5, \pm6, \pm7, \pm8, \pm9, \pm10, \pm11, \pm13, \pm15, \pm17, \pm19\}$.

The difference between the non-normalized Q-path value of the combined constellation and an integer $Z_Q$ is less than a second threshold, and $Z_Q$ is taken from the set $\{\pm1, \pm2, \pm3, \pm4, \pm5, \pm6, \pm7, \pm8, \pm9, \pm10, \pm11, \pm13, \pm15, \pm17, \pm19\}$.

Optionally, the combined constellation is obtained by mapping the modulation symbol, and a bit sequence mapped at a constellation point in the k-th row and the l-th column in the q-point combined constellation is the same as the bit sequence mapped at a constellation point in the k-th row and the l-th column in the q-point combined constellation in the LTE application, and q is taken from a set $\{16, 64, 256\}$.

The first threshold and the second threshold may be the same value: 0.001, and may be two different values, which are not limited in the embodiment of the present disclosure.

For example, m1=4/5, m2=25/29, m3=529/578, for the combined constellation determined by the transmission power ratios m1, m2, m3, a difference between the non-normalized I-path value and an integer Z is less than 0.001, and the Z is ranged as a set {±1, ±3, ±7, ±8, ±15}.

The noise introduced by an error of less than 0.001 is much lower than white noise and quantization noise. The combined constellation is obtained by mapping the 16-point combined modulation symbols. A bit sequence mapped at a constellation point in the k-th row and the l-th column of the 16-point combined constellation is the same as a bit sequence mapped at a constellation point in the k-th row and the l-th column of the 16QAM LET constellation.

In another preferred implementation of the present embodiment, when n=3, the first set of bit sequence is $b_0(i)$, $b_0(i+1)$, and the second set of bit sequence is $b_1(i)$, $b_1(i+1)$, $b_1(i+2)$, $b_1(i+3)$, the modulation mode of the first modulation may be QPSK modulation, and the modulation mode of the second modulation may be Quadrature Amplitude Modulation of 16 symbols (16QAM). In this case, the transmission power ratio $\alpha_j$ belongs to a set R, where the set R={r1, r2, r3}.

It should be noted that the above-mentioned modulation symbols in the embodiment of the present disclosure may be understood as being obtained by weighting the first modulation symbol $x_0$ and the second modulation symbol $x_1$, and may also be referred to as a combined modulation symbol.

For example, r1=0.762, r2, r3 are elements of a set B2, and the set B2 is a discrete subset of a set [0.75, 0.95]. The elements of the set B2 are uniformly distributed between [0.8, 0.95], and the interval of the distribution is 0.025. For example, the values of the set B2 may include 0.8, 0.825, 0.85, 0.875, 0.925, and so on.

In another preferred implementation of this embodiment, when n=5, the first set of bit sequence is $b_0(i)$, $b_0(i+1)$, and the second set of bit sequence is $b_1(i)$, $b_1(i+1)$, $b_1(i+2)$, $b_1(i+3)$, $b_1(i+4)$, $b_1(i+5)$. The modulation mode of the first modulation may be QPSK modulation, and the modulation mode of the second modulation may be 64QAM modulation. In this case, the transmission power ratio $\alpha_j$ belongs to a set P, where the set P={p1, p2, p3}.

For example, p1=0.753, p2, p3 are elements of a set B3, and the set B3 is a discrete subset of a set [0.75, 0.95]. The elements of the set B3 are uniformly distributed between [0.75, 0.95], and the interval of the distribution is 0.025. For example, the elements of the set B3 may include 0.75, 0.775, 0.8, 0.825, and so on.

In an exemplary implementation of this embodiment, when the values of n are different, the sets of values of the transmission power ratios are different. For example, when n=1, $\alpha_j$ belongs to the set M, when n=3, $\alpha_j$ belongs to the set R, and when n=5, $\alpha_j$ belongs to the set P, then there is an intersection between the sets M, R, and P, and the intersection is not empty. There is an intersection between at least two sets of the sets M, R, and P, and the intersection includes one or two values. For example, the intersection is a subset of a set {0.8, 0.85, 0.875, 0.9}.

The transmission power ratio $\alpha_j$ of this embodiment is mainly transmitted with 2-bit signaling, and the 2 bits include four states, of which three states denote the values of $\alpha_j$, and one state denotes the switching of the transmission mode.

The transmission mode includes a transmission mode in which interference exists, and a transmission mode in which no interference exists.

It should be noted that although the embodiment has been described in which the transmission power ratio $\alpha_j$ includes three values, however, it may be conceived that $\alpha_j$ includes one, two, four or other numbers, which is not limited in the embodiment.

Figure 3:
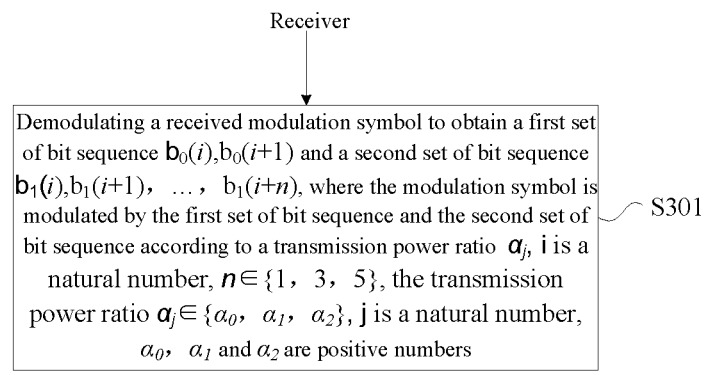
FIG. 3 is a flowchart of a method for processing a modulation symbol at a receiver side according to the first embodiment of the present disclosure.

In order to better understand the present disclosure, FIG. 3 is a flowchart of a method for processing a modulation symbol according to the first embodiment of the present disclosure. As shown in FIG. 3, the method includes the following step.

In step S301, demodulating a received modulation symbol to obtain a first set of bit sequence $b_0(i)$, $b_0(i+1)$ and a second set of bit sequence $b_1(i)$, $b_1(i+1)$, . . . , $b_1(i+n)$, where the modulation symbol is modulated by the first set of bit sequence and the second set of bit sequence according to a transmission power ratio $\alpha_j$, where i is a natural number, n ∈ {1, 3, 5}, the transmission power ratio $\alpha_j \in \{\alpha_0, \alpha_1, \alpha_2\}$, j is a natural number, and $\alpha_0$, $\alpha_1$ and $\alpha_2$ are all positive numbers.

It should be noted that the modulation symbol and the number and the values of the transmission power ratio $\alpha_j$ in the above demodulation process all correspond to the processing method of the above modulation process.

The entity for performing the above-mentioned demodulation method may be a receiving device such as a receiver or a demodulator, or any other device having a demodulation function, which is not limited in this embodiment.

From the description of the above embodiments, those skilled in the art can clearly understand that the method according to the above embodiment can be implemented by means of software in combination with a necessary general hardware platform, and of course, by hardware. However, in many cases, the former is a better implementation. Based on such understanding, the technical solution of the present disclosure, in its essential or as a part contributing to the related art, may be embodied in the form of a software product stored in a storage medium (such as ROM/RAM, a magnetic disk, an optical disc), including a number of instructions for causing a terminal device (which may be a cell phone, a computer, a server, or a network device, etc.) to perform the method of various embodiments of the present disclosure.

Second Embodiment

In order to better understand the processing method in the first embodiment, an apparatus for processing a modulating symbol is also provided in the present embodiment, which is applied to a transmitter. The apparatus is used to implement the above embodiment and preferred implementations, and the description that has been made will be omitted. As used below, the term "module" may implement a combination of software and/or hardware of a predetermined function. Although the apparatus described in the following embodiment may be implemented in software, hardware, or a combination of software and hardware, is also possible and contemplated.

Figure 4:
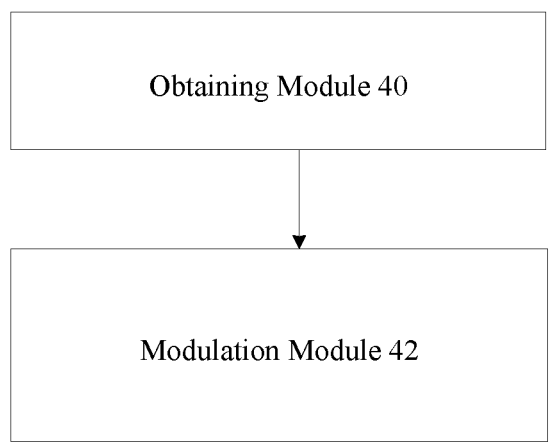
FIG. 4 is a block diagram (1) of an apparatus for processing a modulation symbol at a transmitter side according to a second embodiment of the present disclosure.

FIG. 4 is a block diagram (1) of an apparatus for processing a modulation symbol at a transmitter side according to a second embodiment of the present disclosure. As shown in FIG. 4, the apparatus includes an obtaining module 40 and a modulation module 42.

The obtaining module 40 is configured to obtain a transmission power ratio $\alpha_j$, where the transmission power ratio $\alpha_j \in \{\alpha_0, \alpha_1, \alpha_2\}$, j is a natural number, $\alpha_0$, $\alpha_1$ and $\alpha_2$ are all positive numbers.

The modulation module 42 is configured to modulate a first set of bit sequence $b_0(i)$, $b_0(i+1)$ and a second set of bit sequence $b_1(i)$, $b_1(i+1)$, . . . , $b_1(i+n)$ according to the transmission power ratio $\alpha_j$ to obtain a modulation symbol, where i is a natural number, n ∈ {1, 3, 5}.

With the embodiment, the obtaining module 40 obtains the value of the transmission power ratio from the set of values of three transmission power ratios, and uses the modulation module 42 to modulate the two sets of bit sequences by the determined transmission power ratio to obtain a modulation symbol, which can solve the problem in the related art that the performance of the system is affected and the complexity of signaling design is increased since the specific values and the number of the transmission power ratios are uncertain, and in turn, can reduce the signaling overhead and improve the system stability and demodulation performance.

In an exemplary solution, $\alpha_0$ is an element in the set A, $\alpha_1$ and $\alpha_2$ are elements in the set B, and the set B is a discrete subset of a set [0.7, 0.95]. The set A includes 3 elements, and the value of n is inversely related to the transmission power ratio $\alpha_0$. The elements of the set B are uniformly distributed between [0.8, 0.95], and the interval of the distribution is 0.05 or 0.025.

Figure 5:
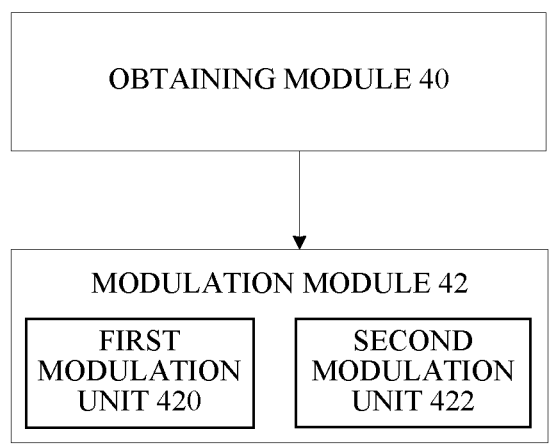
FIG. 5 is a block diagram (2) of an apparatus for processing a modulation symbol at a transmitter side according to the second embodiment of the present disclosure.

FIG. 5 is a block diagram (2) of an apparatus for processing a modulation symbol at a transmitter side according to the second embodiment of the present disclosure. As shown in FIG. 5, a joint modulation module 42 provided in this embodiment includes a first modulation unit 420 and a second modulation unit 422.

The first modulation unit 420 is configured to, according to the transmission power ratio $\alpha_j$, modulate the first set of bit sequence $b_0(i)$, $b_0(i+1)$ to generate a first weighted modulation symbol $\sqrt{\alpha_j}x_0$, where $x_0$ denotes a first modulation symbol.

The second modulation unit 422 is configured to, according to the transmission power ratio $\alpha_j$, modulate the first set of bit sequence $b_0(i)$, $b_0(i+1)$ and the second set of bit sequence to generate a second weighted modulation symbol $\sqrt{1-\alpha_j}x_1$, where $x_1$ denotes a second modulation symbol.

In an exemplary solution of this embodiment, the first modulation symbol $x_0$ is determined by the following formula:

$$x_0 = \text{modulator\_LTE}(b_0(i), b_0(i+1)).$$

The second modulation symbol is determined by the following formula:

$$x_1 = \text{modulator\_LTE}(f((b_0(i),b_0(i+1)),(b_1(i)b_1(i+1) \ldots b_1(i+n)))).$$

The obtained two modulation symbols are weighted according to a transmission power ratio $\alpha_j$ to obtain a modulation symbol, which can be implemented by:

allocating transmission power to the modulation symbols $x_0$ and $x_1$ according to the power ratio $\alpha_j$, to obtain the modulation symbol through the following formula:

$$\sqrt{\alpha_j}x_0 + \sqrt{1-\alpha_j}x_1.$$

In an exemplary implementation of the present embodiment, when n=1, the first set of bit sequence is $b_0(i)$, $b_0(i+1)$, the second set of bit sequence is $b_1(i)$, $b_1(i+1)$, the first modulation mode may be QPSK modulation, and the second modulation mode may be QPSK modulation. In this case, the transmission power ratio $\alpha_j$ belongs to a set M, where the set M={m1, m2, m3}.

For example, m1=0.8, m2, m3 are elements of a set B1, and the set B1 is a discrete subset of a set [0.8, 0.95]. The elements of the set B1 are uniformly distributed between [0.8, 0.95], and the interval of the distribution is 0.025. For example, the values of the set B1 may include 0.8, 0.825, 0.85, 0.875, 0.925, and so on.

In another preferred implementation of the present embodiment, when n=3, the first set of bit sequence is $b_0(i)$, $b_0(i+1)$, and the second set of bit sequence is $b_1(i)$, $b_1(i+1)$, $b_1(i+2)$, $b_1(i+3)$, the modulation mode of the first modulation may be QPSK modulation, and the modulation mode of the second modulation may be Quadrature Amplitude Modulation of 16 symbols (16QAM). In this case, the transmission power ratio $\alpha_j$ belongs to a set R, where the set R={r1, r2, r3}.

For example, r1=0.762, r2, r3 are elements of a set B2, and the set B2 is a discrete subset of a set [0.75, 0.95]. The elements of the set B2 are uniformly distributed between [0.8, 0.95], and the interval of the distribution is 0.025. For example, the values of the set B2 may include 0.8, 0.825, 0.85, 0.875, 0.925, and so on.

In another preferred implementation of this embodiment, when n=5, the first set of bit sequence is $b_0(i)$, $b_0(i+1)$, and the second set of bit sequence is $b_1(i)$, $b_1(i+1)$, $b_1(i+2)$, $b_1(i+3)$, $b_1(i+4)$, $b_1(i+5)$. The modulation mode of the first modulation may be QPSK modulation, and the modulation mode of the second modulation may be 64QAM modulation. In this case, the transmission power ratio $\alpha_j$ belongs to a set P, where the set P={p1, p2, p3}.

For example, p1=0.753, p2, p3 are elements of a set B3, and the set B3 is a discrete subset of a set [0.75, 0.95]. The elements of the set B3 are uniformly distributed between [0.75, 0.95], and the interval of the distribution is 0.025. For example, the elements of the set B3 may include 0.75, 0.775, 0.8, 0.825, and so on.

In an exemplary implementation of this embodiment, when the values of n are different, the set of values of the transmission power ratios is different. For example, when n=1, $\alpha_j$ belongs to the set M, when n=3, $\alpha_j$ belongs to the set R, and when n=5, $\alpha_j$ belongs to the set P, then there is an intersection between the sets M, R, and P, and the intersection is not empty. There may be an intersection between at least two sets of the sets M, R, and P, and the intersection includes one or two values. For example, the intersection is a subset of a set {0.8, 0.85, 0.875, 0.9}.

The transmission power ratio $\alpha_j$ of this embodiment is mainly transmitted with 2-bit signaling, and the 2 bits include four states, of which three states denote the values of $\alpha_j$, and one of the four states denotes the switching of the transmission mode.

The transmission mode includes a transmission mode in which interference exists, and a transmission mode in which no interference exists.

It should be noted that although the embodiment has been described in which the transmission power ratio $\alpha_j$ includes three values, however, it may be conceived that $\alpha_j$ includes one, two, four or other numbers, which is not limited in the embodiment.

The present apparatus may be applied in a transmitter device such as a transmitter, a modulator or other any device having a modulation and encoding function, which is not limited in this embodiment.

Figure 6:
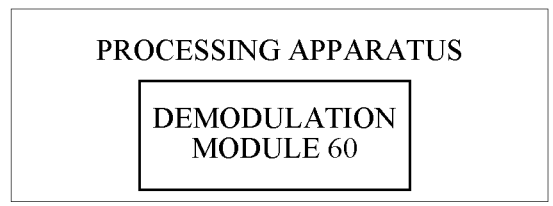
FIG. 6 is a block diagram of an apparatus for processing a modulation symbol at a receiver side according to the second embodiment of the present disclosure.

In order to better understand the present disclosure, the present embodiment also provides an apparatus for processing a modulation symbol, which may be applied to a receiver. FIG. 6 is a block diagram of an apparatus for processing a modulation symbol at a receiver side according to the second embodiment of the present disclosure may include a demodulation module 60.

The demodulation module 60 is configured to demodulate a received modulation symbol to obtain a first set of bit sequence $b_0(i)$, $b_0(i+1)$ and a second set of bit sequence $b_1(i)$, $b_1(i+1)$, . . . , $b_1(i+n)$, where the modulation symbol is modulated by the first set of bit sequence and the second set of bit sequence according to a transmission power ratio $\alpha_j$, where i is a natural number, n ∈ {1, 3, 5}, the transmission power ratio $\alpha_j \in \{\alpha_0, \alpha_1, \alpha_2\}$, j is a natural number, and $\alpha_0$, $\alpha_1$ and $\alpha_2$ are all positive numbers.

It should be noted that in the processing apparatus of the demodulation process, the number and the values of the transmission power ratio $\alpha_j$ all correspond to the processing apparatus of the above modulation process.

The processing apparatus may be a receiving device such as a receiver or a demodulator, or any other device having a demodulation function, which is not limited in this embodiment.

Figure 7:
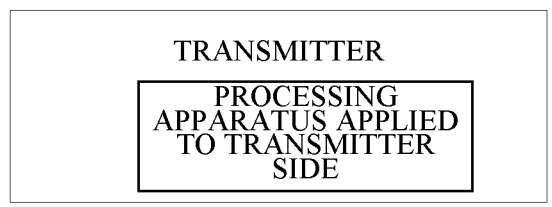
FIG. 7 is a block diagram of a transmitter according to the second embodiment of the present disclosure.
Figure 8:
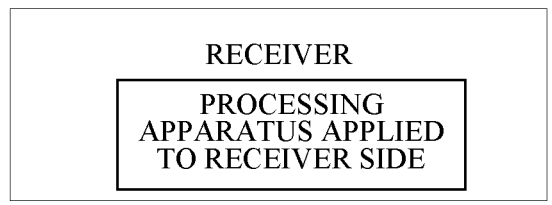
FIG. 8 is a block diagram of a receiver according to the second embodiment of the present disclosure.

In order to better understand the technical solutions of the foregoing embodiments, the embodiment further provides a transmitter and a receiver. FIG. 7 is a block diagram of a transmitter according to the second embodiment of the present disclosure. As shown in FIG. 7, the transmitter includes a processing apparatus therein, which is the processing apparatus applied to the transmitter side involved in the above technical solution. FIG. 8 is a block diagram of a receiver according to the second embodiment of the present disclosure. As shown in FIG. 8, the receiver includes a processing apparatus therein, which is a processing apparatus applied to the receiver side in the above technical solution.

Third Embodiment

In order to better understand the technical solution of the present disclosure, the present embodiment provides a modulation, superposition and transmission method and apparatus. The transmitter transmits the data to be transmitted to the receiver through a joint modulation mapping method. In the case of ensuring the system performance, it is determined that in each modulation combination, the number of the transmission power ratios is 2, and the set of the values of the transmission power ratios is {0.753 0.762 0.8 0.85 0.875 0.9 0.95}, and the relationship among the transmission power ratio sets of each modulation combination is determined.

The transmitter obtains two modulation symbols by performing joint modulation and mapping on two sets of bit information to be transmitted, and the two modulation symbols are weighted by the power factor to obtain a third modulation symbol, and the third modulation symbol is sent to different receiving terminals.

The joint modulation mapping may include a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 1, the bit information sent by the transmitter to the far user is expressed as $b_0(i), b_0(i+1)$, the transmitter performs modulation mapping with the first modulation mode to obtain a corresponding modulation symbol $x_0$, and the first modulation mode is QPSK modulation; the bit information sent by the transmitter to the near user is expressed as $b_1(i), b_1(i+1), \ldots, b_1(i+n)$, and the transmitter performs modulation mapping with the second modulation mode to obtain a corresponding modulation symbol $x_1$.

TABLE 1

Joint Modulation Mapping Table

| First Bit Sequence | First Modulation Symbol | Second Bit Sequence | Second Modulation Symbol |
|---|---|---|---|
| $b_0(i), b_0(i + 1)$ | $x_0$ | $b_1(i), b_1(i + 1), \ldots, b_1(i + n)$ | $x_1$ | where $x_0 = \text{modulator\_LTE}(b_0(i), b_0(i+1))$, $x_1 = \text{modulator\_LTE}(f((b_0(i), b_0(i+1)), (b_1(i)b_1(i+1) \ldots b_1(i+n))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user.

The value range and the number of values of $\alpha_j$ affect the system performance. In the case of ensuring performance, according to the simulation research results, the set of values of $\alpha_j$ is given in the embodiment of the present disclosure, and $\alpha_j$ has a maximum number of three.

The selection of transmission power ratios for each joint modulation combination is as shown in Table 2.

TABLE 2

| | Joint Modulation Combination | | |
|---|---|---|---|
| | QPSK + QPSK | QPSK + 16QAM | QPSK + 64QAM |
| Transmission Power Ratio $\alpha_j$ | a1 | b1 | c1 |
| | a2 | b2 | c2 |
| | a3 | b3 | c3 |

When n=1, and the joint modulation combination is QPSK+QPSK, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 3, the bit information sent by the transmitter to the far user is expressed as $b_0(i), b_0(i+1)$, the transmitter performs modulation mapping with the first modulation mode to obtain a corresponding modulation symbol $x_0$, and the first modulation mode is QPSK modulation; the bit information sent by the transmitter to the near user is expressed as $b_1(i), b_1(i+1)$, and the transmitter performs modulation mapping with the second modulation mode to obtain a corresponding modulation symbol $x_1$.

TABLE 3

Joint Modulation Mapping Table

| First Bit Sequence | First Modulation Symbol | Second Bit Sequence | Second Modulation Symbol |
|---|---|---|---|
| $b_0(i)$, $b_0(i+1)$ | $x_0$ | $b_1(i)$, $b_1(i+1)$ | $x_1$ | where $x_0 = \text{modulator\_LTE}(b_0(i), b_0(i+1))$, $x_1 = \text{modulator\_LTE}(f((b_0(i), b_0(i+1)), (b_1(i), b_1(i+1))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user. For the combination of bit sequences ($b_0$, $b_1$), $\alpha_j$ is {a1, a2, a3}, and $\alpha_j \in \{0.8, 0.85, 0.875, 0.9, 0.95\}$.

When n=3, and the joint modulation combination is QPSK+16QAM, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 4, the bit information sent by the transmitter to the far user is expressed as $b_0(i)$, $b_0(i+1)$, the transmitter performs modulation mapping with the first modulation mode to obtain a corresponding modulation symbol $x_0$, and the first modulation mode is QPSK modulation; the bit information sent by the transmitter to the near user is expressed as $b_1(i)$, $b_1(i+1)$, $b_1(i+2)$, $b_1(i+3)$, and the transmitter performs modulation mapping with the second modulation mode to obtain a corresponding modulation symbol $x_1$.

TABLE 4

Joint Modulation Mapping Table

| First Bit Sequence | First Modulation Symbol | Second Bit Sequence | Second Modulation Symbol |
|---|---|---|---|
| $b_0(i)$, $b_0(i+1)$ | $x_0$ | $b_1(i)$, $b_1(i+1)$, $b_1(i+2)$, $b_1(i+3)$ | $x_1$ | where $x_0 = \text{modulator\_LTE}(b_0(i), b_0(i+1))$, $x_1 = \text{modulator\_LTE}(f((b_0(i), b_0(i+1)), (b_1(i), b_1(i+1), b_1(i+2), b_1(i+3))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user. For the combination of bit sequences ($b_0$, $b_1$), $\alpha_j$ is {b1, b2, b3}, and $\alpha_j \in \{0.762, 0.8, 0.85, 0.875, 0.9, 0.95\}$.

When n=5, and the joint modulation combination is QPSK+64QAM, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 5, the bit information sent by the transmitter to the far user is expressed as $b_0(i)$, $b_0(i+1)$, the transmitter performs modulation mapping with the first modulation mode to obtain a corresponding modulation symbol $x_0$, and the first modulation mode is QPSK modulation; the bit information sent by the transmitter to the near user as is expressed as $b_1(i)$, $b_1(i+1)$, $b_1(i+2)$, $b_1(i+3)$, $b_1(i+4)$, $b_1(i+5)$, and the transmitter performs modulation mapping with the second modulation mode to obtain a corresponding modulation symbol $x_1$.

TABLE 5

Joint Modulation Mapping Table

| First Bit Sequence | First Modulation Symbol | Second Bit Sequence | Second Modulation Symbol |
|---|---|---|---|
| $b_0(i)$, $b_0(i+1)$ | $x_0$ | $b_1(i)$, $b_1(i+1)$, $b_1(i+2)$, $b_1(i+3)$, $b_1(i+4)$, $b_1(i+5)$ | $x_1$ | where $x_0 = \text{modulator\_LTE}(b_0(i), b_0(i+1))$, $x_1 = \text{modulator\_LTE}(f((b_0(i), b_0(i+1)), (b_1(i), b_1(i+1), b_1(i+2), b_1(i+3), b_1(i+4), b_1(i+5))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user. For the combination of bit sequences ($b_0$, $b_1$), $\alpha_j$ is {c1, c2, c3}, and $\alpha_j \in \{0.753, 0.8, 0.85, 0.875, 0.9, 0.95\}$.

The a1, a2, a3, b1, b2, b3, c1, c2, and c3 are all selected from the set {0.753, 0.762, 0.8, 0.85, 0.875, 0.9, 0.95}.

The a1, b1, and c1 are determined values, a1=0.8, b1=0.762, and c1=0.753.

The a2, a3, b2, b3, c2, and c3 are selected from {0.8, 0.85, 0.875, 0.9, 0.95}. The a2, a3, b2, b3, c2, and c3 satisfy the uniform distribution between [0.8, 0.95].

The transmission power ratio sets of at least two modulation combinations has an intersection, and the intersection is not an empty set.

For example, {a1, a2, a3} and {b1, b2, b3} have a2=b2=c2, or {a1, a2, a3} and {c1, c2, c3} have a1=c2, {a1, a2, a3} and {b1, b2, b3} have a2=b3, {b1, b2, b3} and {c1, c2, c3} have b2=c3 or {a1, a2, a3} and {b1, b2, b3} have a1=b2.

Fourth Embodiment

In order to make the objective, technical solutions and advantages of the present disclosure more apparent, the present disclosure will now be described in detail with reference to the examples thereof.

Example 1

In this embodiment, there are transmission power ratio sets of three kinds of joint modulation combinations, in which there is one intersection between two transmission power ratio sets. As shown in Table 6 below, the number of transmission power ratios for each modulation combination is three, and the joint modulation combination QPSK+QPSK and the joint modulation combination QPSK+16QAM both include a transmission power ratio of 0.875.

TABLE 6

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.875 | 0.875 | 0.825 |
| | 0.95 | 0.9 | 0.85 |

As shown in Table 7 below, the number of transmission power ratios for each modulation combination is three, and the joint modulation combination QPSK+QPSK and the joint modulation combination QPSK+64QAM both include a transmission power ratio of 0.8.

TABLE 7

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.875 | 0.85 | 0.8 |
| | 0.95 | 0.9 | 0.875 |

As shown in Table 8 below, the number of transmission power ratios for each modulation combination is three, and the joint modulation combination QPSK+16QAM and the joint modulation combination QPSK+64QAM both include a transmission power ratio of 0.875.

TABLE 8

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.9 | 0.85 | 0.825 |
| | 0.95 | 0.875 | 0.875 |

When n=1, and the joint modulation combination is QPSK+QPSK, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 9, the bit information sent by the transmitter to the far user is expressed as $b_0(i)$, $b_0(i+1)$, the transmitter performs modulation mapping with the first modulation mode to obtain a corresponding modulation symbol $x_0$, and the first modulation mode is QPSK modulation; the bit information sent by the transmitter to the near user is expressed as $b_1(i)$, $b_1(i+1)$, and the transmitter performs modulation mapping with the second modulation mode to obtain a corresponding modulation symbol $x_1$.

TABLE 9

| Joint Modulation Mapping Table | | | |
|---|---|---|---|
| First Bit Sequence | First Modulation Symbol | Second Bit Sequence | Second Modulation Symbol |
| $b_0(i)$, $b_0(i + 1)$ | $x_0$ | $b_1(i)$, $b_1(i + 1)$ | $x_1$ | where $x_0$=modulator_LTE($b_0(i),b_0(i+1)$), $x_1$=modulator_LTE($f((b_0(i),b_0(i+1)),(b_1(i),b_1(i+1)))$), modulator_LTE denotes the LTE modulation mode, and $f(\square)$ denotes a function, for example, $f((b_0(i), b_0(i+1)), (b_1(i), b_1(i+1)))=(c_0(i), c_0(i+1))$. By an exclusive NOR operation, $c_0(i)=b_0(i)\square b_1(i)$ and $c_0(i+1)=b_0(i+1)\square b_1(i+1)$ are obtained, or by an exclusive OR operation, $c_0(i)=b_0(i) \oplus b_1(i)$ and $c_0(i+1)=b_0(i+1) \oplus b_1(i+1)$ are obtained.

The two modulation symbols are weighted by a power factor to obtain a third modulation symbol, and the third modulation symbol is transmitted to a different receiving terminals.

The third modulation symbol is denoted as $\sqrt{\alpha_j}x_0+\sqrt{1-\alpha_j}x_1$, where $\alpha_j$ denotes the transmission power ratio selected by the far user. For the combination of bit sequences ($b_0$, $b_1$), $\alpha_j$ is {a1 a2 a3}, and a1=0.8, a2=0.875, a3=0.95.

When n=3, and the joint modulation combination is QPSK+16QAM, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 10, the bit information sent by the transmitter to the far user is expressed as $b_0(i)$, $b_0(i+1)$, the transmitter performs modulation mapping with the first modulation mode to obtain a corresponding modulation symbol $x_0$, and the first modulation mode is QPSK modulation; the bit information sent by the transmitter to the near user is expressed as $b_1(i)$, $b_1(i+1)$, $b_1(i+2)$, $b_1(i+3)$, and the transmitter performs modulation mapping with the second modulation mode to obtain a corresponding modulation symbol $x_1$.

TABLE 10

Joint Modulation Mapping Table

| First Bit Sequence | First Modulation Symbol | Second Bit Sequence | Second Modulation Symbol |
|---|---|---|---|
| $b_0(i)$, $b_0(i+1)$ | $x_0$ | $b_1(i)$, $b_1(i+1)$, $b_1(i+2)$, $b_1(i+3)$ | $x_1$ | where $x_0 = \text{modulator\_LTE}(b_0(i), b_0(i+1))$, $x_1 = \text{modulator\_LTE}(f((b_0(i), b_0(i+1))), (b_1(i), b_1(i+1), b_1(i+2), b_1(i+3))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user. For the combination of bit sequences $(b_0, b_1)$, $\alpha_j$ is {b1 b2 b3}, and b1=0.762, b2=0.875, b3=0.9.

When n=5, and the joint modulation combination is QPSK+64QAM, the transmitter obtains two modulation symbols by performing joint modulation mapping on the two sets of bit information to be transmitted, and the two modulation symbols are weighted by the power factor to obtain a third modulation symbol, and the third modulation symbol is sent to different receiving terminals.

The joint modulation mapping includes a first modulation and a second modulation.

The transmitter allocates the same frequency domain resource to multiple receiving terminals at the same time. The multiple receiving terminals are divided into two types: a near user and a far user. For convenience of explanation, two receiving terminals are taken as an example. As shown in the following table 11, the bit information sent by the transmitter to the far user is expressed as $b_0(i)$, $b_0(i+1)$, the transmitter performs modulation mapping with the first modulation mode to obtain a corresponding modulation symbol $x_0$, and the first modulation mode is QPSK modulation; the bit information sent by the transmitter to the near user as is expressed as $b_1(i)$, $b_1(i+1)$, $b_1(i+2)$, $b_1(i+3)$, $b_1(i+4)$, $b_1(i+5)$, and the transmitter performs modulation mapping with the second modulation mode to obtain a corresponding modulation symbol $x_1$.

TABLE 11

Joint Modulation Mapping Table

| First Bit Sequence | First Modulation Symbol | Second Bit Sequence | Second Modulation Symbol |
|---|---|---|---|
| $b_0(i)$, $b_0(i+1)$ | $x_0$ | $b_1(i)$, $b_1(i+1)$, $b_1(i+2)$, $b_1(i+3)$, $b_1(i+4)$, $b_1(i+5)$ | $x_1$ | where $x_0 = \text{modulator\_LTE}(b_0(i), b_0(i+1))$, $x_1 = \text{modulator\_LTE}(f((b_0(i), b_0(i+1))), (b_1(i), b_1(i+1), b_1(i+2), b_1(i+3), b_1(i+4), b_1(i+5))))$, modulator_LTE denotes the LTE modulation mode, and $f(\square)$ denotes a function.

The two modulation symbols are weighted by a power factor to obtain a third modulation symbol, and the third modulation symbol is transmitted to a different receiving terminals.

The third modulation symbol is denoted as $\sqrt{\alpha_j}x_0 + \sqrt{1-\alpha_j}x_1$, where $\alpha_j$ denotes the transmission power ratio selected by the far user. For the combination of bit sequences $(b_0, b_1)$, $\alpha_j$ is {c1, c2, c3}, and c1=0.753, c2=0.85, c3=0.875.

Example 2

The implementation of this embodiment is the same as that of the example 1. In this embodiment, there are transmission power ratio sets of three kinds of joint modulation combinations, in which there is one intersection among the transmission power ratio sets.

As shown in Table 12 below, the number of transmission power ratios for each modulation combination is three, and each of the joint modulation combinations includes a transmission power ratio of 0.8.

TABLE 12

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.85 | 0.8 | 0.8 |
| | 0.95 | 0.9 | 0.875 |

As shown in Table 13 below, the number of transmission power ratios for each modulation combination is three, and each of the joint modulation combinations includes a transmission power ratio of 0.85.

TABLE 13

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.85 | 0.85 | 0.85 |
| | 0.95 | 0.875 | 0.9 |

As shown in Table 14 below, the number of transmission power ratios for each modulation combination is three, and each of the joint modulation combinations includes a transmission power ratio of 0.875.

TABLE 14

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.875 | 0.875 | 0.85 |
| | 0.95 | 0.9 | 0.875 |

As shown in Table 15 below, the number of transmission power ratios for each modulation combination is three, and each of the joint modulation combinations includes a transmission power ratio of 0.9.

TABLE 15

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.9 | 0.9 | 0.9 |
| | 0.95 | 0.875 | 0.85 |

Example 3

The implementation of this embodiment is the same as that of the example 1. In this embodiment, there are transmission power ratio sets of three kinds of joint modulation combinations, in which there is one intersection between two of the transmission power ratio sets, and there are totally two intersections.

As shown in Table 17 below, the number of transmission power ratios for each modulation combination is three, the joint modulation combination QPSK+QPSK and the joint modulation combination QPSK+16QAM both include a transmission power ratio of 0.85, and the joint modulation combination QPSK+QPSK and the joint modulation combination QPSK+64QAM both include a transmission power ratio of 0.8.

TABLE 17

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.85 | 0.85 | 0.8 |
| | 0.95 | 0.9 | 0.875 |

As shown in Table 18 below, the number of transmission power ratios for each modulation combination is three, the joint modulation combination QPSK+QPSK and the joint modulation combination QPSK+16QAM both include a transmission power ratio of 0.875, and the joint modulation combination QPSK+QPSK and the joint modulation combination QPSK+64QAM both include a transmission power ratio of 0.8.

TABLE 18

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.875 | 0.875 | 0.8 |
| | 0.95 | 0.9 | 0.85 |

As shown in Table 19 below, the number of transmission power ratios for each modulation combination is three, the joint modulation combination QPSK+QPSK and the joint modulation combination QPSK+16QAM both include a transmission power ratio of 0.85, and the joint modulation combination QPSK+QPSK and the joint modulation combination QPSK+64QAM both include a transmission power ratio of 0.9.

TABLE 19

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.85 | 0.85 | 0.825 |
| | 0.9 | 0.875 | 0.9 |

Example 4

The implementation of this embodiment is the same as that of the example 1. In this embodiment, there are transmission power ratio sets of three kinds of joint modulation combinations, in which there is one intersection between two of the transmission power ratio sets, and there are totally three intersections.

As shown in Table 20 below, the number of transmission power ratios for each modulation combination is three, the joint modulation combination QPSK+QPSK and the joint modulation combination QPSK+16QAM both include a transmission power ratio of 0.85, the joint modulation combination QPSK+QPSK and the joint modulation combination QPSK+64QAM both include a transmission power ratio of 0.8, and the joint modulation combination QPSK+16QAM and the joint modulation combination QPSK+64QAM both include a transmission power ratio of 0.9.

TABLE 20

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.85 | 0.85 | 0.8 |
| | 0.95 | 0.9 | 0.9 |

As shown in Table 21 below, the number of transmission power ratios for each modulation combination is three, the joint modulation combination QPSK+QPSK and the joint modulation combination QPSK+16QAM both include a transmission power ratio of 0.875, the joint modulation combination QPSK+QPSK and the joint modulation combination QPSK+64QAM both include a transmission power ratio of 0.8, and the joint modulation combination QPSK+16QAM and the joint modulation combination QPSK+64QAM both include a transmission power ratio of 0.875.

TABLE 21

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.875 | 0.875 | 0.8 |
| | 0.95 | 0.9 | 0.9 |

As shown in Table 22 below, the number of transmission power ratios for each modulation combination is three, the joint modulation combination QPSK+QPSK and the joint modulation combination QPSK+16QAM both include a transmission power ratio of 0.9, the joint modulation combination QPSK+QPSK and the joint modulation combination QPSK+64QAM both include a transmission power ratio of 0.8, and the joint modulation combination QPSK+16QAM and the joint modulation combination QPSK+64QAM both include a transmission power ratio of 0.875.

TABLE 22

| | Joint Modulation Combination | | |
|---|---|---|---|
| | QPSK + QPSK | QPSK + 16QAM | QPSK + 64QAM |
| Transmission Power Ratio $\alpha_j$ | 0.8 | 0.762 | 0.753 |
| | 0.9 | 0.875 | 0.8 |
| | 0.95 | 0.9 | 0.875 |

It can be seen from the following Table 23 that the beneficial effect of the present embodiment is that when the number of the selected transmission power ratios is 3, compared to the case when the number of the transmission power ratios is 2, the edge spectrum efficiency is significantly improved. When the number of the selected transmission power ratios is 3, the system performance is close to that when the number of the transmission power ratios is 4, but with a lower system complexity and smaller overhead for signaling instruction compared to the case when the number of the transmission power ratios is 4. In summary, with the transmission power ratio scheme of the present disclosure, the performance is close to optimal, the system complexity is low, only two bits of signaling are required to indicate the transmission power ratio, and the two bits are fully utilized. In the state information represented by the two bits, three states indicate the values of the transmission power ratios, and one state indicates switching of the transmission mode.

TABLE 23

| Simulation Performance | | |
|---|---|---|
| | Average Spectrum Efficiency | Edge Spectrum Efficiency |
| Baseline(SU-MIMO) | 1.3350 | 0.0186 |
| 2 Power Ratios | 1.4432 | 0.0225 |
| Gain | 8.04% | 22.24% |
| 3 Power Ratios | 1.4375 | 0.0236 |
| Gain | 7.68% | 27.22% |
| 4 Power Ratios | 1.4437 | 0.0233 |
| Gain | 8.14% | 25.34% |

Fifth Embodiment

The embodiment of the present disclosure also provides a storage medium. Optionally, in the embodiment, the foregoing storage medium may be used to store the program codes for performing the method for processing a modulation symbol provided in the above first embodiment.

Optionally, in this embodiment, the foregoing storage medium may be located in any one of the wireless communication terminals in the wireless communication group in the computer network, or in any one of the mobile terminals in the mobile terminal group.

Optionally, in the present embodiment, the storage medium is arranged to store program codes for performing the following steps.

In step S1, joint modulation mapping is performed on two sets of bit sequences to be transmitted to obtain two modulation symbols.

In step S2, the obtained two modulation symbols are weighted according to a transmission power ratio $\alpha_j$ to obtain a modulation symbol, where the transmission power ratio $\alpha_j \in \{\alpha_0, \alpha_1, \alpha_2\}$, j is a natural number, $\alpha_0 \square \{0.8, 0.762, 0.753\}$, $\alpha_1$ and $\alpha_2$ are elements in the set B, and the set B is a discrete subset of the set [0.7, 0.95].

The Embodiment of the present disclosure also provides a storage medium. Optionally, in the embodiment, the foregoing storage medium may be configured to store program codes for performing the following steps.

In step S1, the received modulation symbol is demodulated, and the modulation symbol is obtained by weighting two modulation symbols according to a transmission power ratio $\alpha_j$, and the two modulation symbols are obtained by performing joint modulation mapping on two sets of bit sequences. The transmission power ratio $\alpha_j \in \{\alpha_0, \alpha_1, \alpha_2\}$, j is a natural number, $\alpha_0 \in \{0.8, 0.762, 0.753\}$, $\alpha_1$ and $\alpha_2$ are elements in the set B, and the set B is a discrete subset of the set [0.7, 0.95].

The serial numbers of the embodiments of the present disclosure are merely for the description, and do not represent the superiority of the embodiments.

In the above-mentioned embodiments of the present disclosure, the descriptions of the various embodiments are emphasized on different parts, and the parts that are not detailed in a certain embodiment can be referred to the related descriptions of other embodiments.

In the several embodiments provided by the present application, it should be understood that the disclosed technical contents may be implemented in other manners. The device embodiments described above are merely illustrative. For example, the division of the units is only a logical function division. In actual implementation, there may be another division manner. For example, multiple units or components may be combined or may be integrated into another system, or some features can be ignored or not executed. In addition, the mutual coupling or direct coupling or communication connection shown or discussed may be an indirect coupling or communication connection through some interfaces, units or modules, and may be electrical or in other forms.

The units described as separate components may or may not be physically separated, and the components displayed as units may or may not be physical units, that is, may be located in one place, or may be distributed to multiple network units. Some or all of the units may be selected according to actual needs to achieve the objective of the solution of the embodiment.

In addition, each functional unit in each embodiment of the present disclosure may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure, in its essential or as a part contributing to the related art, or all or part of the technical solution, may be embodied in the form of a software product stored in a storage medium. A number of instructions are included to cause a computer device (which may be a personal computer, server or network device, etc.) to perform all or part of the steps of the methods described in various embodiments of the present disclosure. The foregoing storage medium includes various medium that may store program codes such as a U disk, a Read-Only Memory (ROM), a Random Access Memory (RAM), a removable hard disk, a magnetic disk, or an optical disk, and the like.

The above description is only preferred embodiments of the present disclosure, and is not intended to limit the present disclosure, and various modifications and changes can be made to the present disclosure by those skilled in the art. Any modifications, equivalent substitutions, improvements, etc. made within the spirit and scope of the present disclosure are intended to be included within the scope of the present disclosure.

INDUSTRIAL APPLICABILITY

The foregoing technical solution provided by the embodiment of the present disclosure can be applied to a modulation symbol processing, and the two sets of bit sequences are modulated according to a transmission power ratio to obtain a modulation symbol, and the number of transmission power ratios is determined to be three, which can solve the problem in the related art that the performance of the system is affected and the complexity of signaling design is increased since the number of the transmission power ratios is uncertain, and in turn, can reduce the signaling overhead and improve the system stability and demodulation performance.

What is claimed is:

1. A method for processing a modulation symbol, comprising:
    obtaining, by a transmitter, a transmission power ratio $\alpha_j$, wherein the transmission power ratio $\alpha_j \in \{\alpha_0, \alpha_1, \alpha_2\}$, j is a natural number, $\alpha_0$, $\alpha_1$ and $\alpha_2$ are all positive numbers, and wherein the transmission power ratio $\alpha_j$ is a ratio of a transmission power allocated by the transmitter to a far user on a superposition layer to a total transmission power on the superposition layer;
    modulating, by the transmitter, a first set of bit sequence $b_0(i), b_0(i+1)$ and a second set of bit sequence $b_1(i), b_1(i+1), \ldots, b_1(i+n)$ according to the transmission power ratio $\alpha_j$, to obtain the modulation symbol, where i is a natural number, and $n \in \{1, 3, 5\}$.

2. The method according to claim 1, wherein the $\alpha_0$ is an element in a set A, the $\alpha_1$ and $\alpha_2$ are elements in a set B, and the set B is a discrete subset of a set [0.7, 0.95].

3. The method according to claim 2, wherein the set A comprises 3 elements, and the value of n is inversely related to the transmission power ratio $\alpha_0$.

4. The method according to claim 1, wherein modulating, by the transmitter, a first set of bit sequence $b_0(i), b_0(i+1)$ and a second set of bit sequence $b_1(i), b_1(i+1), \ldots, b_1(i+n)$ according to the transmission power ratio $\alpha_j$, to obtain a modulation symbol, comprises:
    according to the transmission power ratio $\alpha_j$, modulating the first set of bit sequence $b_0(i), b_0(i+1)$ to generate a first weighted modulation symbol $\sqrt{\alpha_j}x_0$, where $x_0$ denotes a first modulation symbol; and
    according to the transmission power ratio $\alpha_j$, modulating the first set of bit sequence $b_0(i), b_0(i+1)$ and the second set of bit sequence $b_1(i), b_1(i+1), \ldots, b_1(i+n)$ to generate a second weighted modulation symbol $\sqrt{1-\alpha_j}x_1$, where $x_1$ denotes a second modulation symbol.

5. The method according to claim 4, wherein the first modulation symbol $x_0$ and the second modulation symbol $x_1$ are respectively determined by the following formula:
    $x_0$=modulator_LTE($b_0(i), b_0(i+1)$),
    $x_1$=modulator_LTE($f((b_0(i), b_0(i+1)), (b_1(i)b_1(i+1) \ldots b_1(i+n))))$,
    wherein modulator_LTE denotes a long-term evolution (LTE) modulation mode using an LTE technology.

6. The method according to claim 1, wherein modulating, by the transmitter, a first set of bit sequence $b_0(i), b_0(i+1)$ and a second set of bit sequence $b_1(i), b_1(i+1), \ldots, b_1(i+n)$ according to the transmission power ratio $\alpha_j$, to obtain a modulation symbol, comprises:
    performing joint modulation and mapping on the first set of bit sequence $b_0(i), b_0(i+1)$ and the second set of bit sequence $b_1(i), b_1(i+1), \ldots, b_1(i+n)$ to obtain a first modulation symbol $x_0$ and a second modulation symbol $x_1$; and
    weighting the obtained first modulation symbol $x_0$ and the second modulation symbol $x_1$ according to the transmission power ratio $\alpha_j$, to obtain the modulation symbol.

7. The method according to claim 1, wherein
    the first set of bit sequence $b_0(i), b_0(i+1)$ is modulated with a first modulation mode, to obtain a first modulation symbol $x_0$; and
    a combination of the first set of bit sequence $b_0(i), b_0(i+1)$ and the second set of bit sequence $b_1(i), b_1(i+1), \ldots, b_1(i+n)$ are modulated with a second modulation mode, to obtain a second modulation symbol $x_1$.

8. The method according to claim 1, wherein
    when n=1, the first set of bit sequence is $b_0(i), b_0(i+1)$, the second set of bit sequence is $b_1(i), b_1(i+1)$, the first set of bit sequence $b_0(i), b_0(i+1)$ is modulated with a first modulation mode to obtain a first modulation symbol $x_0$, and a combination of the first set of bit sequence $b_0(i), b_0(i+1)$ and the second set of bit sequence $b_1(i), b_1(i+1), \ldots, b_1(i+n)$ is modulated with a second modulation mode to obtain a second modulation symbol $x_1$; and
    the first modulation mode comprises: Quadrature Phase Shift Keying QPSK modulation, the second modulation mode comprises: QPSK modulation, and the transmission power ratio $\alpha_j$ belongs to a set M, where the set M={m1, m2, m3}.

9. The method according to claim 8, wherein
    the m1=0.8, the m2 and m3 are elements of a set B1, and the set B1 is a discrete subset of a set [0.8, 0.95].

10. The method according to claim 1, wherein
    when n=3, the first set of bit sequence is $b_0(i), b_0(i+1)$, the second set of bit sequence is $b_1(i), b_1(i+1), b_1(i+2), b_1(i+3)$, the first set of bit sequence $b_0(i), b_0(i+1)$ is modulated with a first modulation mode to obtain a first modulation symbol $x_0$, and a combination of the first set of bit sequence $b_0(i), b_0(i+1)$ and the second set of bit sequence $b_1(i), b_1(i+1), \ldots, b_1(i+n)$ is modulated with a second modulation mode to obtain a second modulation symbol $x_1$; and
    the modulation mode of the first modulation comprises QPSK modulation, and the modulation mode of the second modulation comprises Quadrature Amplitude Modulation of 16 symbols 16QAM, the transmission power ratio $\alpha_j$ belongs to a set R, where the set R={r1, r2,r3}.

11. The method according to claim 10, wherein the r1=0.762, the r2, r3 are elements of a set B2, and the set B2 is a discrete subset of a set [0.75, 0.95].

12. The method according to claim 1, wherein when n=5, the first set of bit sequence is $b_0(i),b_0(i+1)$, the second set of bit sequence is $b_1(i),b_1(i+1),b_1(i+2),b_1(i+3),b_1(i+4),b_1(i+5)$, the first set of bit sequence $b_0(i),b_0(i+1)$ is modulated with a first modulation mode to obtain a first modulation symbol $x_0$, and a combination of the first set of bit sequence $b_0(i),b_0(i+1)$ and the second set of bit sequence $b_1(i),b_1(i+1), \ldots, b_1(i+n)$ is modulated with a second modulation mode to obtain a second modulation symbol $x_1$; and the modulation mode of the first modulation comprises QPSK modulation, and the modulation mode of the second modulation comprises 64QAM modulation, the transmission power ratio $\alpha_j$ belongs to a set P, where the set P={p1,p2,p3}.

13. The method according to claim 12, wherein the p1=0.753, the p2, p3 being an element of a set B3, and the set B3 is a discrete subset of a set [0.75, 0.95].

14. The method according to claim 1, wherein the transmission power ratio $\alpha_j$ is transmitted with 2-bit signaling, and the 2 bits comprise four states, of which three states denote the values of $\alpha_j$, and one state denotes a switching of the transmission mode.

15. An apparatus for processing a modulation symbol, applied in a transmitter, comprising:

an obtaining module, configured to obtain a transmission power ratio $\alpha_j$, wherein the transmission power ratio $\alpha_j \in \{\alpha_0,\alpha_1,\alpha_2\}$, j is a natural number, $\alpha_0$, $\alpha_1$ and $\alpha_2$ are all positive numbers, and wherein the transmission power ratio $\alpha_j$ is a ratio of a transmission power allocated by the transmitter to a far user on a superposition layer to a total transmission power on the superposition layer; and a modulation module, configured to modulate a first set of bit sequence $b_0(i),b_0(i+1)$ and a second set of bit sequence $b_1(i),b_1(i+1), \ldots, b_1(i+n)$ according to the transmission power ratio $\alpha_j$ to obtain the modulation symbol, where i is a natural number, n $\in\{1,3,5\}$.

16. The apparatus according to claim 15, wherein the $\alpha_0$ is an element in a set A, the $\alpha_1$ and $\alpha_2$ are elements in a set B, and the set B is a discrete subset of a set [0.7, 0.95].

17. The apparatus according to claim 16, wherein the set A comprises 3 elements and the value of n is inversely related to the transmission power ratio $\alpha_0$.

18. The apparatus according to claim 15, wherein the modulation module comprises:

a first modulation unit configured to, according to the transmission power ratio $\alpha_j$, modulate the first set of bit sequence $b_0(i),b_0(i+1)$ to generate a first weighted modulation symbol $\sqrt{\alpha_j}x_0$, where $x_0$ denotes a first modulation symbol;

a second modulation unit configured to, according to the transmission power ratio $\alpha_j$, modulate the first set of bit sequence $b_0(i),b_0(i+1)$ and the second set of bit sequence to generate a second weighted modulation symbol $\sqrt{1-\alpha_j}x_1$, where $x_1$ denotes a second modulation symbol.

19. The apparatus according to claim 15, wherein the transmission power ratio $\alpha_j$ is transmitted with 2-bit signaling, and the 2 bits comprise four states, of which three states denote the values of $\alpha_j$ and one state denotes a switching of the transmission mode.

20. An apparatus for processing a modulation symbol, applied to a receiver, comprising:

a demodulation module configured to demodulate the received modulation symbol to obtain a first set of bit sequence $b_0(i),b_0(i+1)$ and a second set of bit sequence $b_1, b_1(+1), \ldots, b_1(i+n)$, where the modulation symbol is modulated by the first set of bit sequence and the second set of bit sequence according to a transmission power ratio $\alpha_j$, where i is a natural number, n $\in\{1,3,5\}$, the transmission power ratio $\alpha_j \in \{\alpha_0,\alpha_1,\alpha_2\}$, j is a natural number, and $\alpha_0$, $\alpha_1$ and $\alpha_2$ are all positive numbers, and wherein the transmission power ratio $\alpha_j$ is a ratio of a transmission power allocated by a transmitter to a far user on a superposition layer to a total transmission power on the superposition layer.

* * * * *